United States Patent [19]

Penley et al.

[11] Patent Number: 5,560,683
[45] Date of Patent: Oct. 1, 1996

[54] REPLACABLE SEAT BACK DIAPHRAGM

[75] Inventors: James R. Penley, Pfafftown; Steven R. Huddleston, Lewisville, both of N.C.

[73] Assignee: Burns Aerospace Corporation, Winston-Salem, N.C.

[21] Appl. No.: 435,890

[22] Filed: May 5, 1995

[51] Int. Cl.$^6$ .................................................. A47C 7/02
[52] U.S. Cl. .......................... 297/452.56; 297/DIG. 6; 297/228.13
[58] Field of Search ................. 297/452.56, 452.55, 297/219.1, 228.13, 223, DIG. 6, 284.1, 284.3, 284.5, 284.9, 440.11, 228.1, 482, 452.13

[56] References Cited

U.S. PATENT DOCUMENTS

| | | | |
|---|---|---|---|
| 2,251,318 | 8/1941 | Blair et al. | 297/452.56 X |
| 2,587,128 | 2/1952 | Eull | 297/228.1 |
| 3,185,197 | 5/1965 | Spiro et al. | 297/DIG. 6 X |
| 3,306,662 | 2/1967 | Finnigan | 297/482 |
| 3,455,604 | 7/1969 | Turcksin | 297/440.11 |
| 4,036,524 | 7/1977 | Takawatsu | 297/228.13 X |
| 4,047,756 | 9/1977 | Ney | 297/228.13 X |
| 4,532,948 | 8/1985 | Burrows | 297/440.11 X |
| 4,844,539 | 7/1989 | Selbert | 297/228.13 |
| 5,007,676 | 4/1991 | Lien | 297/228.13 |
| 5,013,089 | 5/1991 | Abu-Isa et al. | 297/452.56 X |
| 5,121,938 | 6/1992 | Gross et al. | 297/228.1 X |
| 5,149,173 | 9/1992 | Jay et al. | 297/DIG. 6 X |
| 5,310,245 | 5/1994 | Lyszczasz | 297/284.9 X |
| 5,393,126 | 2/1995 | Boulva | 297/440.11 X |
| 5,778,040 | 1/1995 | Chaney et al. | 297/452.56 X |

FOREIGN PATENT DOCUMENTS 3434010 6/1986 Germany .............................. 297/482

Primary Examiner—Milton Nelson, Jr.
Attorney, Agent, or Firm—W. Thad Adams, III, P.A.

[57] ABSTRACT

A replaceable seat back diaphragm for a vehicle passenger seat, comprising a fabric panel having opposing top and bottom edges and opposing first and second side edges with complementary fasteners carried by the first and second side edges and cooperating with each other in a fastened position to form the fabric panel into a tensioned, tubular seat back diaphragm around a seat back frame of the passenger seat.

11 Claims, 8 Drawing Sheets ically for use in passenger seats, such as aircraft passenger seats. The diaphragm provides ease of initial assembly and the capability of replacing the diaphragm without removing the seat back frame. Replacement of the diaphragm can take place quickly by removing the covering upholstery, and unzipping the diaphragm. Attachments points to other components are quickly released, as well. The diaphragm and the frame of the seat back form the entire seat back, over which the upholstery is placed to create a finished seat. The diaphragm is relatively inexpensive in comparison with fabricated metal seat back components.

REPLACABLE SEAT BACK DIAPHRAGM

TECHNICAL FIELD AND BACKGROUND OF THE INVENTION

This invention relates to a replaceable seat back diaphragm intended particularly for use in passenger seats, such as aircraft passenger seats. The diaphragm provides ease of initial assembly and the capability of replacing the diaphragm without removing the seat back frame. Replacement of the diaphragm can take place quickly by removing the covering upholstery, and unzipping the diaphragm. Attachments points to other components are quickly released, as well. The diaphragm and the frame of the seat back form the entire seat back, over which the upholstery is placed to create a finished seat. The diaphragm is relatively inexpensive in comparison with fabricated metal seat back components.

The diaphragms can be folded into a very compact package for storage without the need to protect from bending, dropping or other occurrences which might damage conventional fabricated metal seat back components.

The diaphragm is placed under tension when on the seat back frame, and has a slight amount of "give", and thus provides a reasonable degree of comfort for the occupant.

The diaphragm and its components are lightweight, and can include detachable bolsters to provide lateral support to the occupant.

SUMMARY OF THE INVENTION

Therefore, it is an object of the invention to provide a seat back diaphragm which is easily assembled and replaced.

It is another object of the invention to provide a seat back diaphragm which can be replaced without removing the seat back.

It is another object of the invention to provide a seat back diaphragm which is lightweight and can be stored in a compact package.

It is another object of the invention to provide a seat back diaphragm which is fabric and which is placed on the seat back using a zipper.

It is another object of the invention to provide a seat back diaphragm to which can be attached bolsters for providing lateral support to the seat occupant.

It is another object of the invention to provide a seat back diaphragm which is fabricated of woven fabric.

These and other objects of the present invention are achieved in the preferred embodiments disclosed below by providing a replaceable seat back diaphragm for a vehicle passenger seat, comprising a fabric panel having an opposing top and bottom edges and opposing first and second side edges with complementary fasteners carried by the first and second side edges and cooperating with each other in a fastened position to form the fabric panel into a tensioned, tubular seat back diaphragm around a seat back frame of the passenger seat.

According to one preferred embodiment of the invention, the fasteners comprise cooperating first and second interlocking components of a zipper.

According to another preferred embodiment of the invention, the first and second components of the zipper are carried by respective reenforced tapes attached to the opposing side edges of the fabric panel. The tapes and the zipper components extend beyond the top and bottom edges by an amount sufficient to permit the tapes to be manually grasped and the zipper components attached to each other beyond the extent of the fabric panel, and to provide reduced tension on the zipper at the top, bottom and side edges of the fabric panel.

According to yet another preferred embodiment of the invention, the tubular fabric panel comprises a forward side for supporting the back of a seat occupant and a rearward side spaced from the forward side by the seat back frame.

According to yet another preferred embodiment of the invention, the fabric panel is conformed to be positioned on the seat back frame with the fasteners on the rearward side thereof.

According to yet another preferred embodiment of the invention, the bottom edge of the forward side of the fabric panel includes a seat bottom attachment panel for interconnecting the seat back diaphragm with a seat bottom component of the passenger seat.

According to yet another preferred embodiment of the invention, the fabric panel includes attachment members carried adjacent the top edge thereof for cooperating with complementary attachment members carried on the seat back frame.

According to yet another preferred embodiment of the invention, the fabric of the fabric panel comprises a woven fabric.

According to yet another preferred embodiment of the invention, the fabric panel includes first and second bolster attachment members carried by the forward side thereof for receiving bolsters for providing lateral support to the seat occupant.

According to yet another preferred embodiment of the invention, the seat back diaphragm includes first and second bolsters carried on the forward side of the fabric panel in spaced apart relation for providing lateral support to the seat occupant.

According to yet another preferred embodiment of the invention, the bolsters are detachable from the seat diaphragm.

According to yet another preferred embodiment of the invention, the bolsters each comprise elongate tubular cushions attached along their length to the fabric panel.

According to yet another preferred embodiment of the invention, the bolster attachment members each include one-half of a zipper component, and the fabric panel includes complementary zipper components for detachably securing the bolsters to the seat back diaphragm.

According to yet another preferred embodiment of the invention, the seat back diaphragm of the invention is combined with a vehicle passenger seat such as an aircraft passenger seat.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
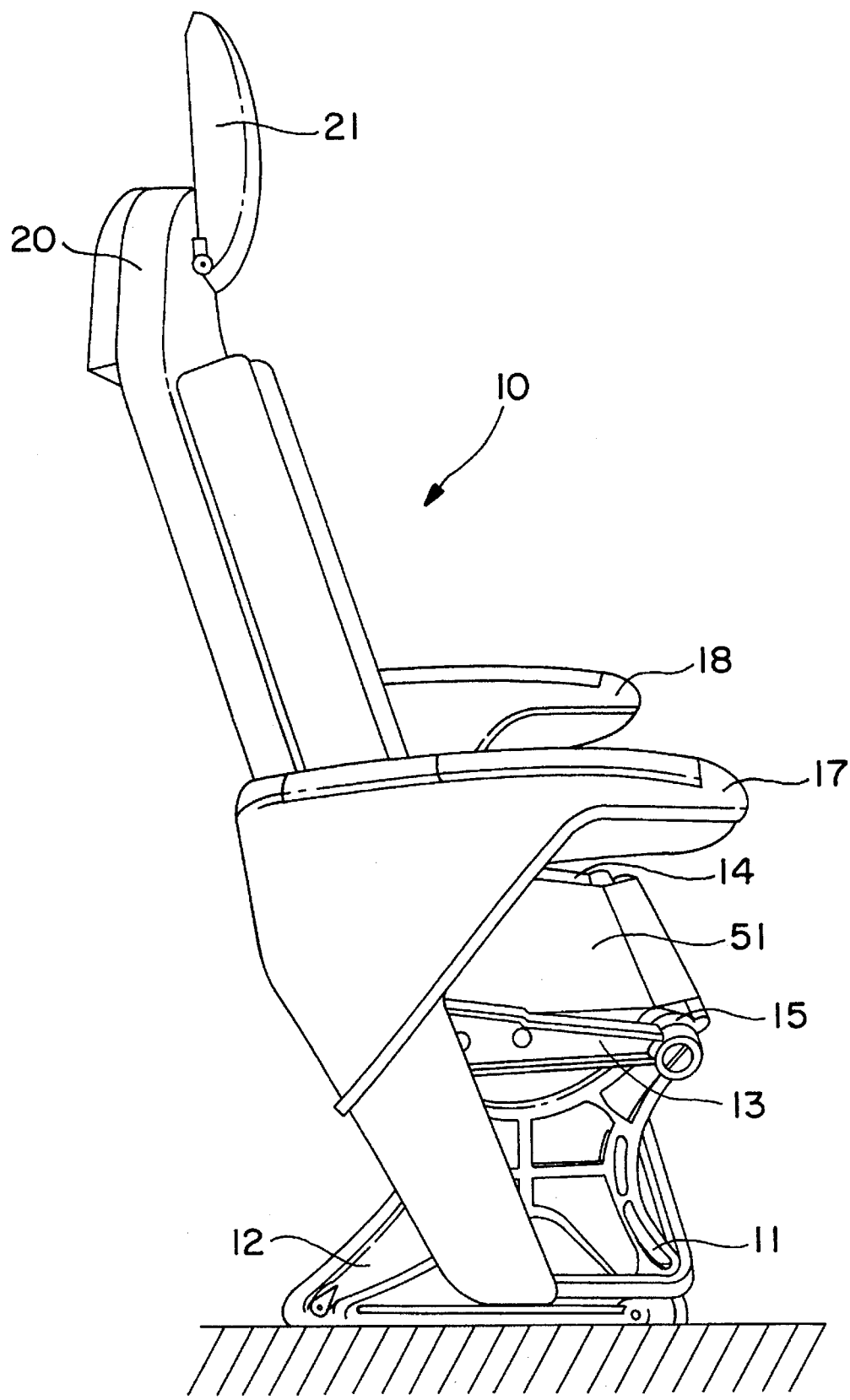
FIG. 1 is a side elevational view of a passenger seat with a seat back diaphragm according to an embodiment of the invention.

Referring now specifically to the drawings, an aircraft passenger seat according to the present invention is illustrated in FIG. 1 and shown generally at reference numeral 10. Seat 10 includes front and back legs 11 and 12 which are normally affixed with track fittings into a track (not shown) mounted on the deck of an aircraft. The seat 10 shown in FIG. 1 is suitable as a relatively high density, short-to-medium haul configuration, and may be a single seat 10 as shown, or combined into seat sets of two or more seats 10. Seat 10 has seat bottom frames 13 and 14 spanned by support tubes 15 and 16 (See FIGS. 1 and 5) on which is mounted a seat diaphragm 51, over which is positioned a seat bottom cushion (not shown). Armrests 17 and 18 are mounted on opposite sides of seat 10. A tubular aluminum seat back frame 20 preferably formed graphite composite, or alternatively, of tubular aluminum, extends upwardly from the seat bottom frames 13 and 14. Seat back frame 20 mounts a headrest 21.

Figure 2:
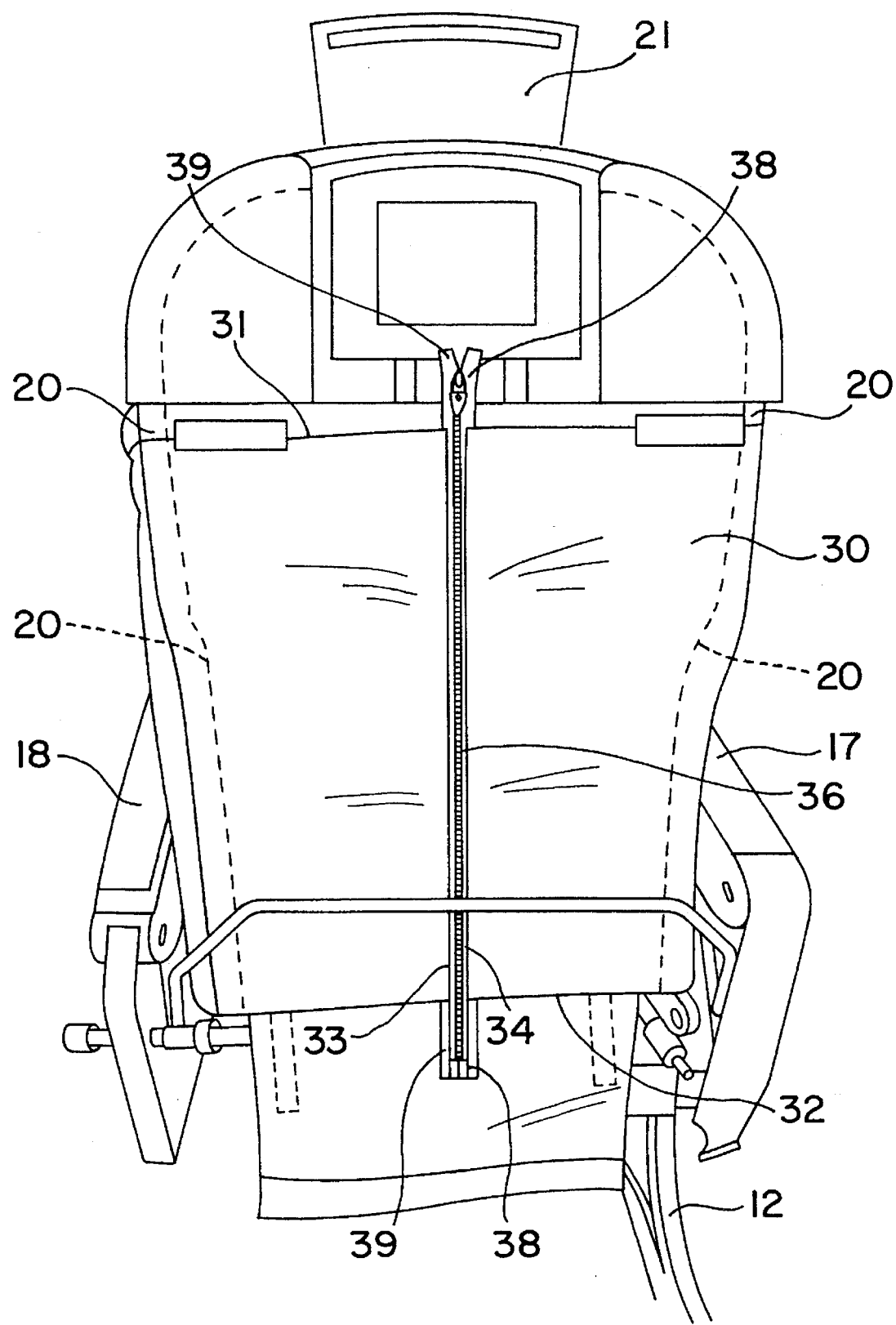
FIG. 2 is a perspective view of the rearward side of the seat in FIG. 1, showing the diaphragm in place on the seat back frame.

Referring now to FIG. 2, a seat back diaphragm 30 according to an embodiment of the invention is shown in position on the seat back frame 20. Seat back diaphragm 30 is constructed of a woven DuPont DYMETROL (DuPont trademark) style C100SW fabric panel. Seat back diaphragm 30 has a top edge 31, a bottom edge 32 and a pair of side edges 33 and 34. As is generally shown in FIG. 2, the diaphragm 30 fits in a tensioned condition over the seat back frame 20, and is fabricated to conform to the shapes and bends of the seat back frame 20.

Figure 3:
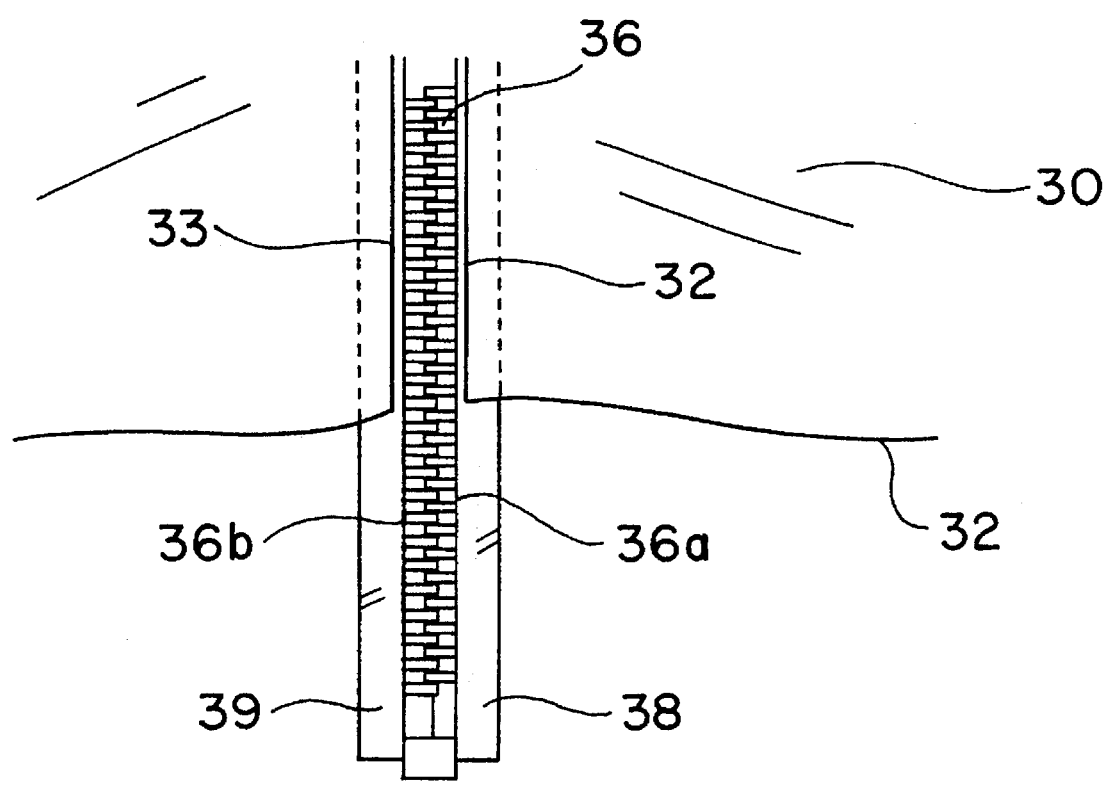
FIG. 3 is an enlarged fragmentary view of the bottom portion of the diaphragm of FIG. 2, showing the lower extended tapes on which the zipper is carried.

The seat back diaphragm is held in position on the seat back frame 20 by a zipper 36 which extends from above the top edge 31 to below the bottom edge 32 of the diaphragm 30. As is best shown in FIG. 3, zipper 36 is formed of two zipper components 36a and 36b which are sewn to narrow fabric tapes 38 and 39. In turn, the tapes 38 and 39 are securely stitched by sewing to the side edges and 33 and 34 of the diaphragm 30. As is shown, the tapes 38 and 39 with the zipper 36 thereon extend 3–4 inches below the bottom edge 32 of the diaphragm 30. This provides an area which can be easily grasped and manually manipulated to interconnect the zipper components 36a and 36b when installing the diaphragm 30. Since the diaphragm is under substantial tension when installed, it would be difficult to exert sufficient tension on the diaphragm 30 to hold the side edges and 33 and 34 together closely enough to connect the zipper components 36a and 36b while at the same time connecting the zipper components.

Use of the extended tapes 39 and 39 therefore permits easy installation by permitting the zipper components 36a and 36b to be connected together in an area where there is no tension. In addition, this feature significantly reduces stress on the bottom edge 32 of the diaphragm 30 and on the zipper 36, since by the time the zipper 36 has been closed to the point of the bottom edge 32 of the diaphragm 30, there is a substantial amount of surface area in the zipper 36 itself over which the tension is spread.

Similarly, tapes 38 and 39 extend upwardly above the diaphragm 30 about 3–4 inches. Thus, the tension on the diaphragm 30 is isolated from the end of the closed zipper 36 by this distance. This reduces the tendency of the tension to slowly unzip the zipper 36. The 3–4 inch distance of the tapes above the top edge 31 of the diaphragm 30 also provides an area which can be easily grasped and manipulated. This is illustrated in FIG. 4.

Figure 4:
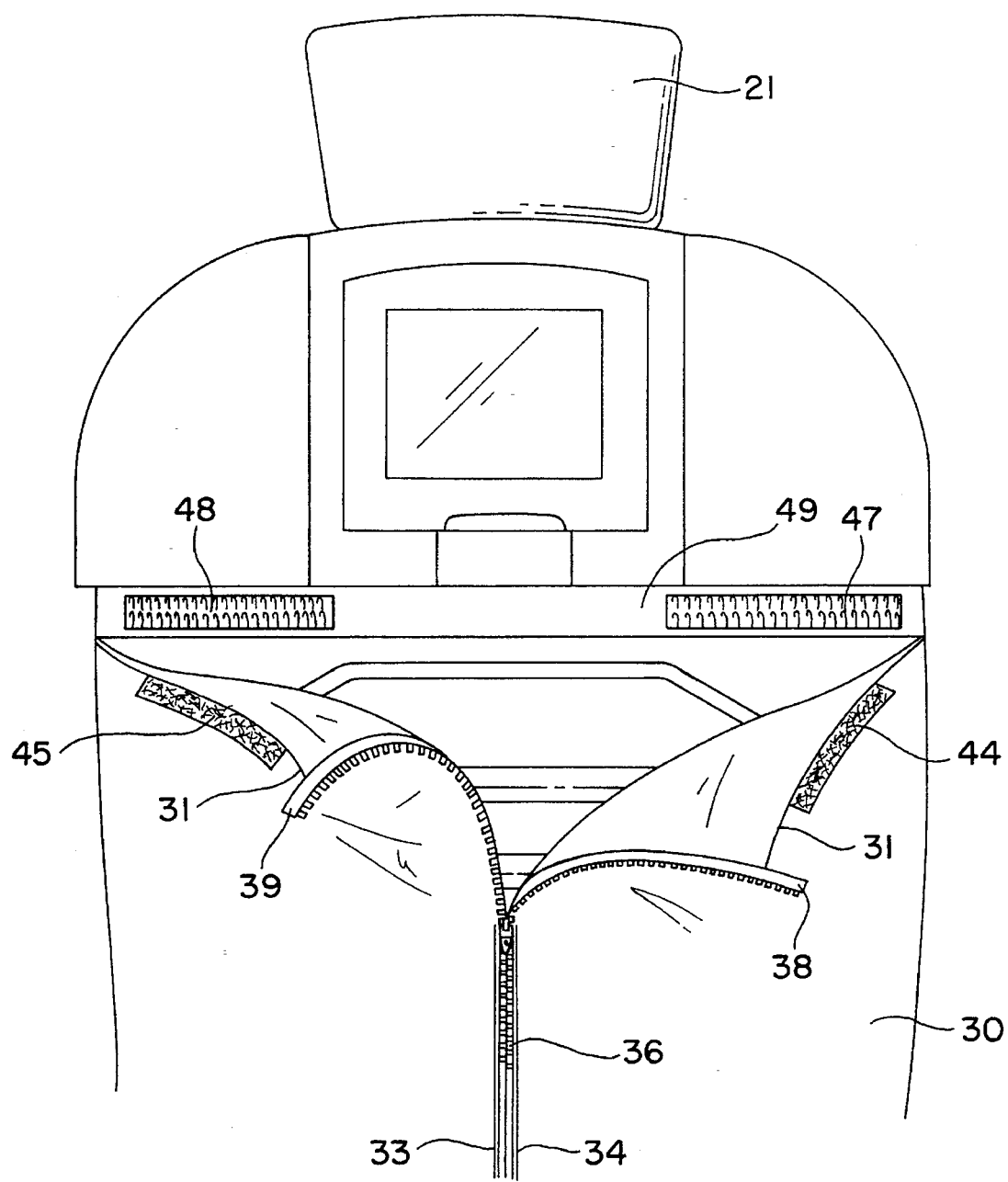
FIG. 4 is an enlarged, fragmentary view of the top portion of the diaphragm of FIG. 2, showing the upper extended tapes on which the zipper is carried.

As is also shown in FIG. 4, a pair of elongate hook and loop fastener strips 44 and 45 are sewn onto the top edge 31 of the diaphragm 30. A portion of each of the strips 44 and 45 is left extending above the top edge 31, and mates with a complementary strip of hook and loop fastener 47 or 48 attached to a lateral support member 49 of the seat back frame 20. This attachment eliminates downward creep of the diaphragm 30 and holds the diaphragm 30 flat against the seat back frame 20.

Figure 5:
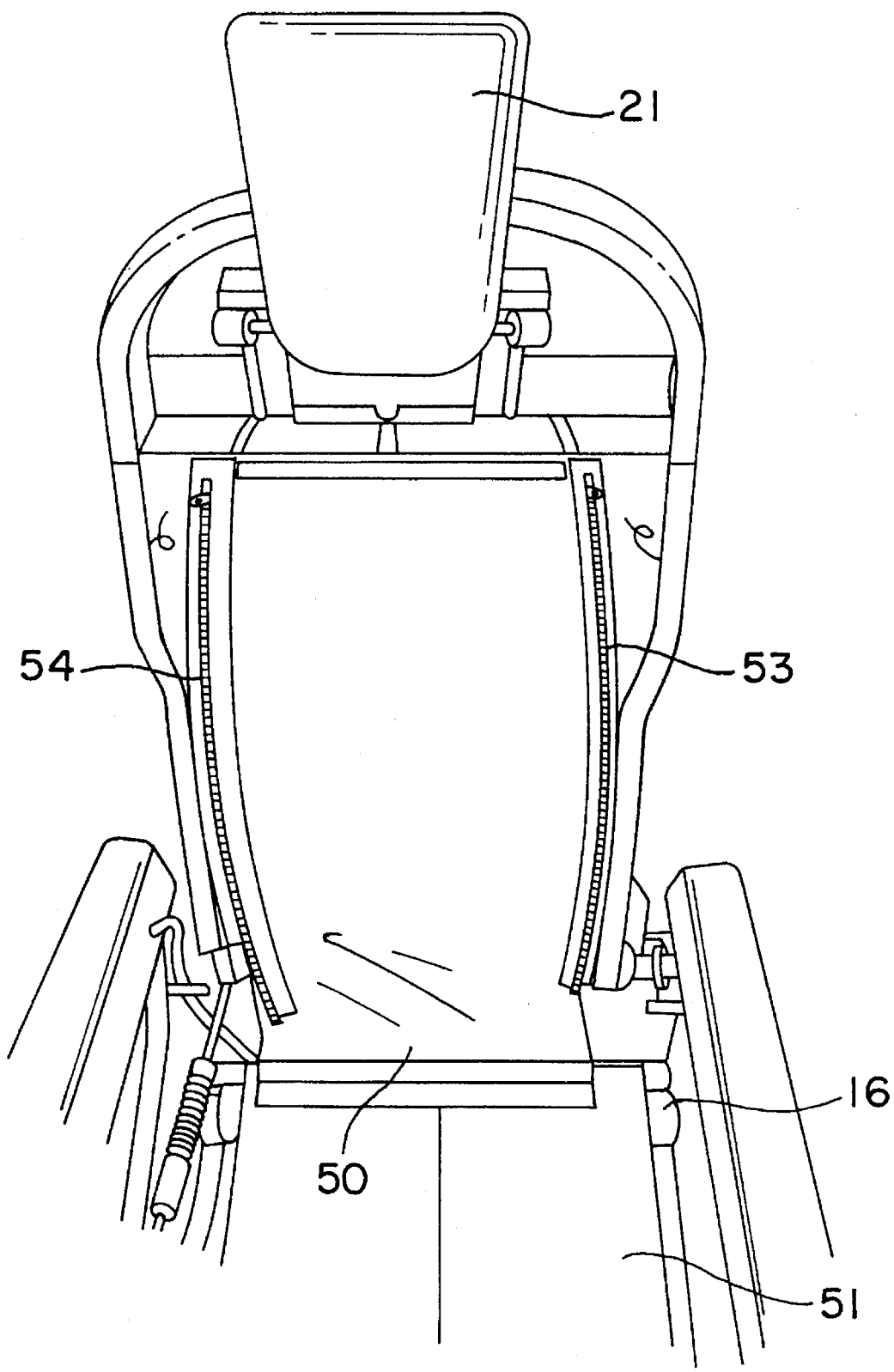
FIG. 5 is a fragmentary perspective view of the seat of FIG. 1 viewed from the front side.

Referring now to FIG. 5, the front of the seat 10 is shown. Seat back diaphragm 30 extends around the front of seat back frame 20 and provides a forward side surface which supports the back of the seat occupant. As noted above, the diaphragm 30 fits tightly around the seat back frame 20 and is under substantial tension. This provides support to the occupant while at the same time providing sufficient "give" to enhance the comfort of the occupant.

The bottom of the forward side of the diaphragm 30 extends downwardly below the extent of the remainder of the diaphragm 30 and forms a seat bottom attachment panel 50 which interconnects the diaphragm 30 with seat bottom diaphragm 51 or other seat bottom component. Preferably, the interconnection is made using complementary hook and loop fasteners (not shown). This interconnection further anchors the seat back diaphragm 30 in its proper position.

Figure 6:
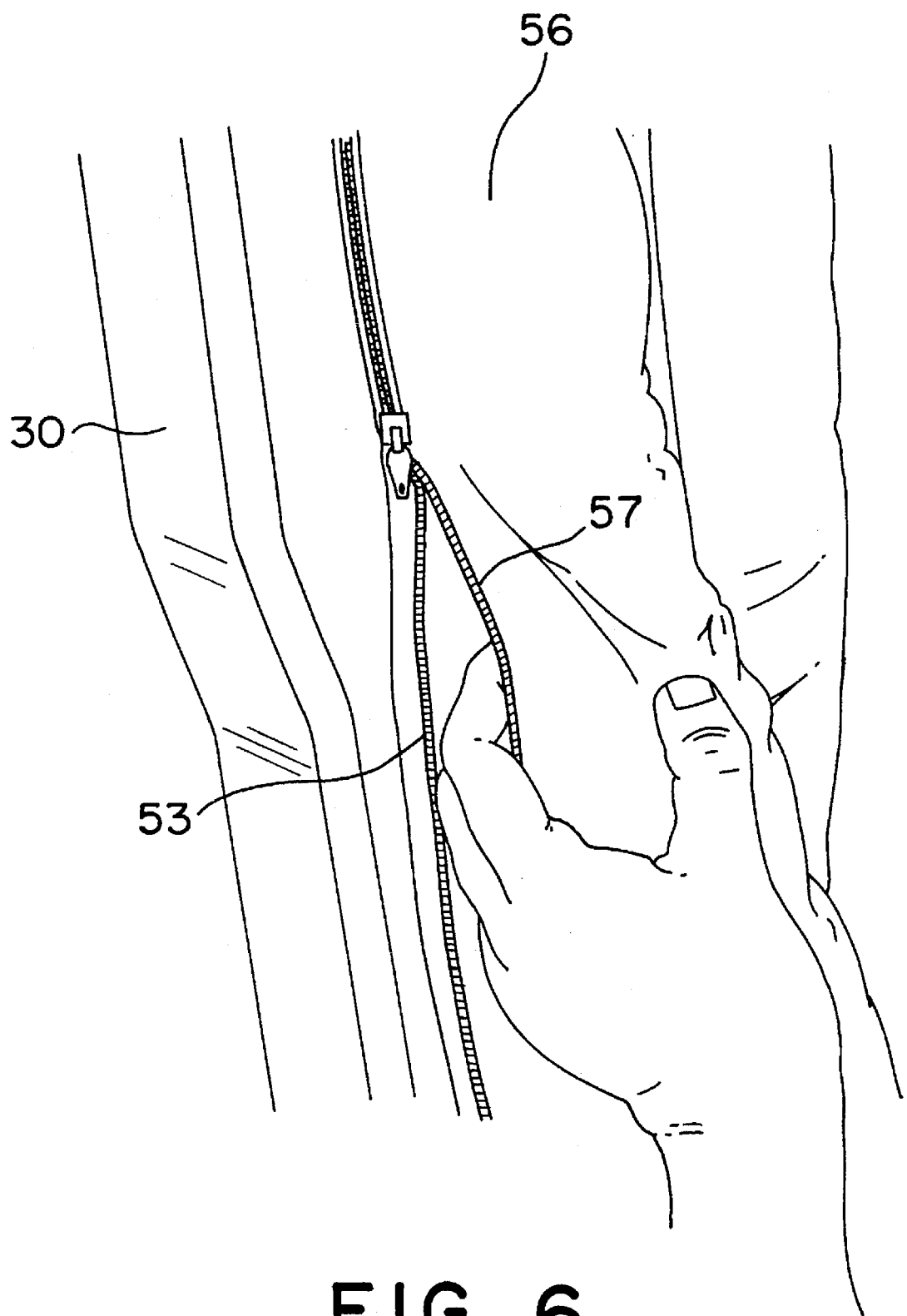
FIG. 6 is a view showing attachment of a bolster to the front of the diaphragm.

As is also shown in FIG. 5, two elongate bolster attachment members in the form of zipper components 53 and 54 extend vertically along the forward side of the seat back diaphragm 30. These zipper components 53 and 54 each comprise one-half of a single zipper. Referring now to FIG. 6, an elongate padded bolster 56 is attached to the diaphragm 30. The bolster 56 has a zipper component 57 which mates with zipper component 53 on the diaphragm 30 and by which the bolster 56 is attached to the diaphragm 30. The bolster is attached to the diaphragm 30 by connecting the two zipper components 53 and 57 and pulling the zipper slide upwardly.

Figure 7:
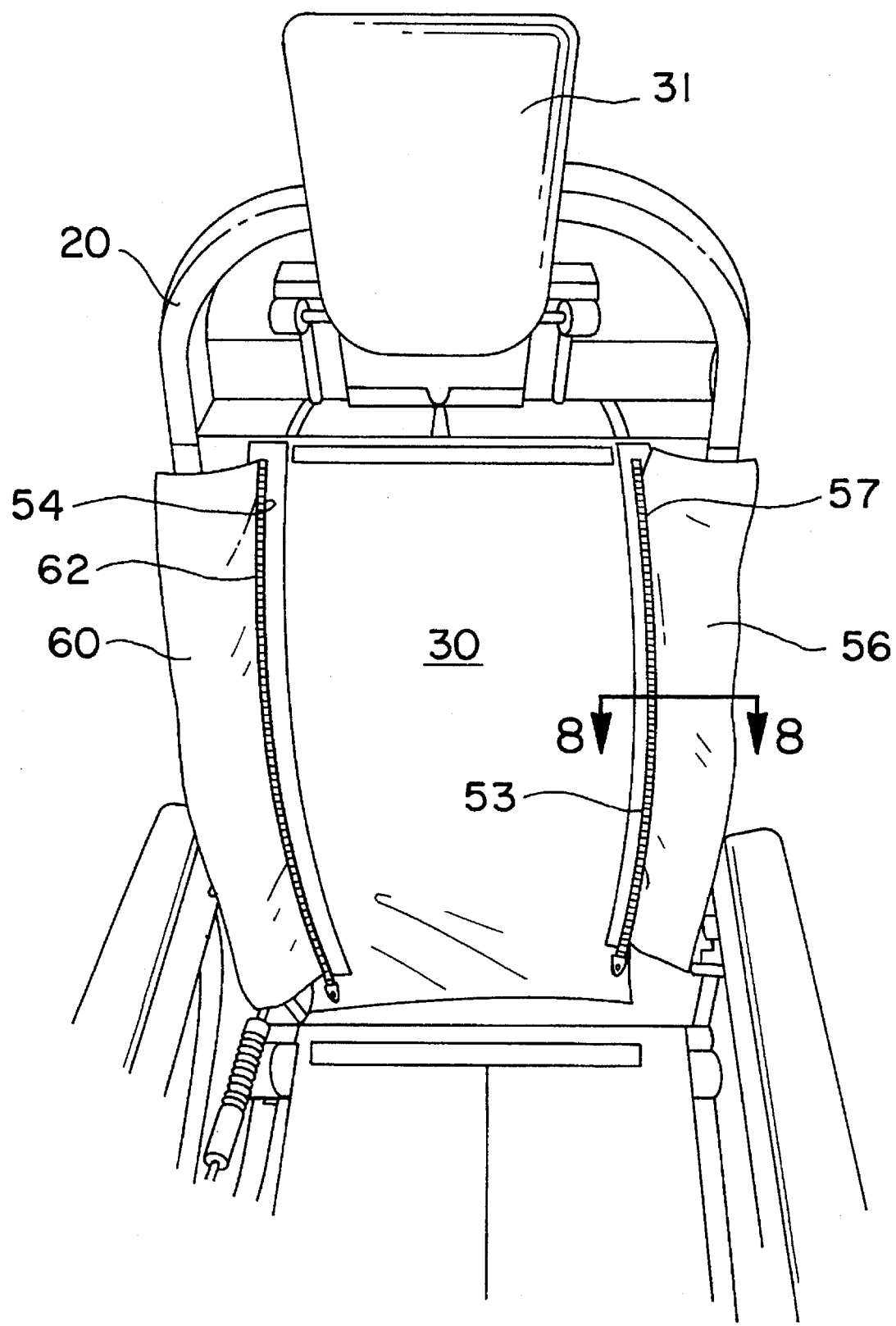
FIG. 7 is a fragmentary perspective view of the seat of FIG. 1 with the bolsters in place.

As is shown in FIG. 7, a bolster 60 is attached to the diaphragm 30, by means of zipper component 54 extending vertically along the forward side of the diaphragm 30 in laterally spaced apart position from the bolster 56, which mates with complementary zipper component 54 extending vertically along the bolster 60.

A upholstered seat cover is placed over the diaphragm 30, with the attached bolsters 56 and 60. When necessary because of wear or soiling, the seat cover can be removed, and the diaphragm 30 quickly removed by unzipping the zipper 36 on the diaphragm 30. If desired, the bolsters 56 and 60 can be removed from the diaphragm 30 being replaced and quickly attached by connecting the zipper components 53,57 and 54, 62. If one or both of the bolsters need replacement, they are easily removed and replaced as described above.

While zippers have been disclosed as the preferred means of forming the diaphragm 30 into its tubular form and for attaching the bolsters 56 and 60 to the diaphragm 30, other attachment means such as hook and loop fastener assemblies or other types of touch fasteners can be used instead.

Figure 8:
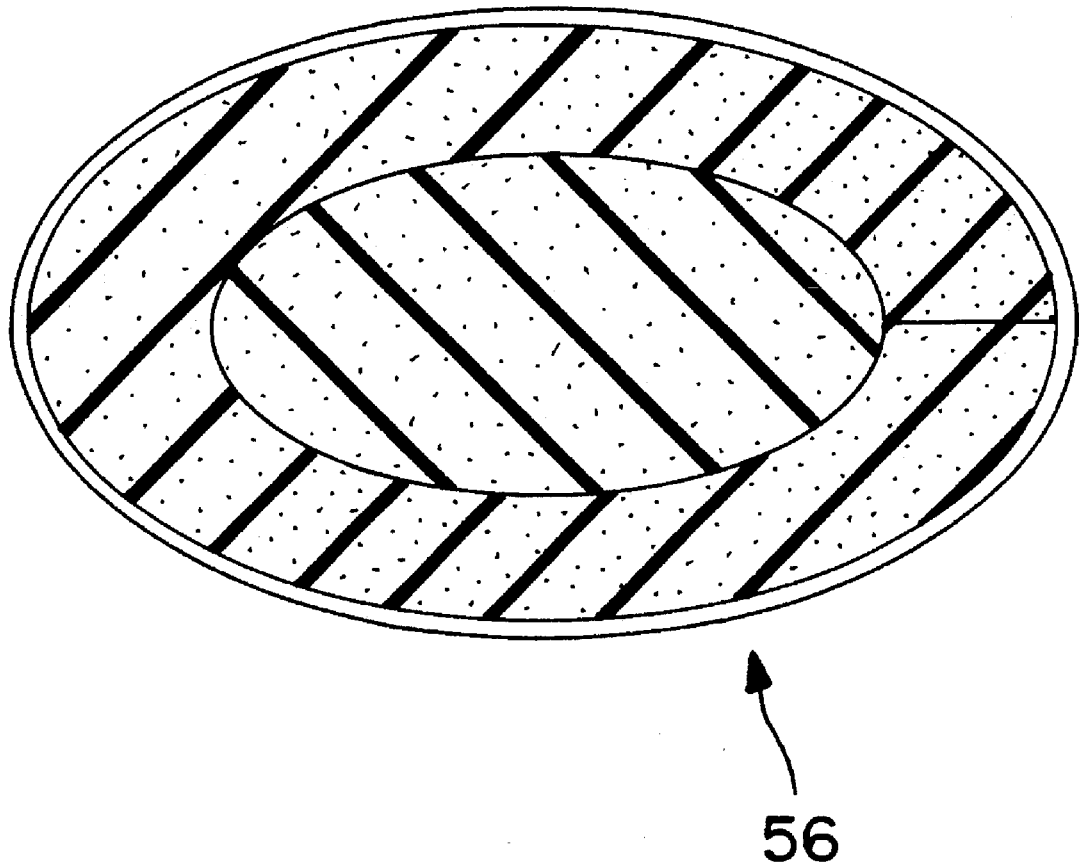
FIG. 8 is a lateral cross-section of a tubular bolster according to the embodiment of the invention shown in FIG. 7.

FIG. 8 shows in cross-section the tubular configuration of the bolster 56 referred to above. A replaceable seat back diaphragm is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A replaceable seat back diaphragm for an open seat back frame of a vehicle passenger seat, comprising:
   (a) a fabric panel having opposing top and bottom edges and opposing first and second side edges;
   (b) complementary fasteners carried by said first and second side edges and cooperating with each other in a fastened position for forming the fabric panel into a tensioned, tubular seat back diaphragm on the seat back frame of the passenger seat for providing support for an overlying seat back cushion and dress cover, and to the back of a passenger seated in the seat:
   (c) wherein said fasteners comprise cooperating first and second interlocking components of a zipper; and
   (d) wherein said first and second components of the zipper are carried by respective reenforced tapes attached to the opposing side edges of the fabric panel, and further wherein said tapes and said zipper components extend beyond the top and bottom edges by an amount sufficient to permit the tapes to be manually grasped and the zipper components attached to each other beyond the extent of the fabric panel, and to provide reduced tension on the zipper at the top, bottom and side edges of the fabric panel.

2. A replaceable seat back diaphragm according to claim 1, wherein the fabric of said fabric panel comprises a woven fabric.

3. A replaceable seat back diaphragm according to claim 1, wherein said tubular fabric panel comprises a forward side for supporting the back of a seat occupant and a rearward side adapted to be spaced from the forward side by the seat back frame, and further wherein said fabric panel is conformed to be positioned on the seat back frame with the fasteners on the rearward side thereof.

4. A replaceable seat back diaphragm according to claim 3, wherein the bottom edge of the forward side of the fabric panel includes a seat bottom attachment panel for interconnecting the seat back diaphragm with a seat bottom component of the passenger seat.

5. A replaceable seat back diaphragm according to claim 3, wherein said fabric panel includes attachment members carried adjacent the top edge thereof for cooperating with complementary attachment members carried on said seat back frame.

6. A replaceable seat back diaphragm according to claim 3, wherein said fabric panel includes first and second bolster attachment members carried by the forward side thereof for receiving bolsters for providing lateral support to the seat occupant.

7. A replaceable seat back diaphragm according to claim 6, wherein said bolster attachment members each include one-half of a zipper component, and said fabric panel includes complementary zipper components for detachably securing the bolsters to the seat back diaphragm.

8. A replaceable seat back diaphragm according to claim 3, wherein said seat back diaphragm includes first and second bolsters carried on the forward side of the fabric panel in spaced apart relation for providing lateral support to the seat occupant.

9. A replaceable seat back diaphragm according to claim 8, wherein said bolsters are detachable from said seat back diaphragm.

10. A replaceable seat back diaphragm according to claim 9, wherein said bolsters each comprise elongate tubular cushions attached along their length to said fabric panel.

11. In combination with a vehicle passenger seat, the replaceable seat back diaphragm according to claim 1, 2, 3, 4, 5, 6, 7, 8, 9 or 10.

* * * * *